US 10,904,741 B2

(12) United States Patent
Chen et al.

(10) Patent No.: US 10,904,741 B2
(45) Date of Patent: Jan. 26, 2021

(54) SYSTEMS AND METHODS FOR QUEUEING SUBSCRIBER IDENTITY MODULE PROFILES ON AN EMBEDDED UNIVERSAL INTEGRATED CIRCUIT CARD

(71) Applicant: Verizon Patent and Licensing Inc., Arlington, VA (US)

(72) Inventors: Zhengfang Chen, Millburn, NJ (US); Musa Kazim Guven, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 7 days.

(21) Appl. No.: 16/134,763

(22) Filed: Sep. 18, 2018

(65) Prior Publication Data
US 2020/0092711 A1 Mar. 19, 2020

(51) Int. Cl.
| | |
|---|---|
| *H04B 1/38* | (2015.01) |
| *H04W 8/18* | (2009.01) |
| *H04W 8/20* | (2009.01) |
| *H04B 1/3816* | (2015.01) |

(52) U.S. Cl.
CPC .......... *H04W 8/183* (2013.01); *H04B 1/3816* (2013.01); *H04W 8/20* (2013.01)

(58) Field of Classification Search
CPC ............. H04M 2250/14; H04W 12/06; H04W 12/0608
See application file for complete search history.

(56) References Cited

U.S. PATENT DOCUMENTS

| | | | | |
|---|---|---|---|---|
| 9,788,190 B2* | 10/2017 | Park | ...................... | H04W 12/06 |
| 2013/0331063 A1* | 12/2013 | Cormier | .............. | H04L 63/0272 455/411 |
| 2014/0162639 A1* | 6/2014 | Patenaude | ............... | H04L 67/30 455/435.1 |
| 2014/0274006 A1* | 9/2014 | Mutya | ..................... | H04W 4/16 455/416 |
| 2016/0105540 A1* | 4/2016 | Kwon | .............. | H04N 21/41407 715/747 |
| 2016/0285493 A1* | 9/2016 | Veneroso | .............. | H04W 8/205 |
| 2017/0156051 A1* | 6/2017 | Park | ........................ | H04L 67/22 |
| 2017/0289788 A1* | 10/2017 | Lalwaney | ........... | H04L 41/0803 |
| 2017/0332274 A1* | 11/2017 | Link, II | ................ | H04W 76/11 |

(Continued)

OTHER PUBLICATIONS

GSM Association, "RSP Architecture", https://www.gsma.com/newsroom/wpcontent/uploads/SGP.21_v2.0.pdf, Aug. 23, 2016, 94 pages.

(Continued)

*Primary Examiner* — Shantell L Heiber

(57) ABSTRACT

In some implementations, a device that includes an embedded universal integrated circuit card (eUICC) may enable a first subscriber identity module (SIM) profile. The first SIM profile may be installed in memory of the eUICC and associated with a first integrated circuit card identifier (ICCID). The device may request a second SIM profile based on enabling the first SIM profile. The second SIM profile may be associated with a second ICCID that is different from the first ICCID. The device may receive the second SIM profile based on requesting the second SIM profile, and may install the second SIM profile in memory of the eUICC in a disabled state. Other implementations are described herein.

20 Claims, 6 Drawing Sheets

(56) References Cited

U.S. PATENT DOCUMENTS

2017/0353939 A1* 12/2017 Behera .................. H04W 8/183
2017/0366962 A1* 12/2017 Kim ...................... H04W 48/16
2019/0098488 A1*  3/2019 Syed ....................... H04W 4/70

OTHER PUBLICATIONS

GSM Association, "RSP Technical Specification" https://www.gsma.com/newsroom/wp-content/uploads/SGP.22_v2.2.pdf, Sep. 1, 2017, 264 pages.
Verizon, "Verizon Open Access LTE 3GPP Band 13 Network Access Requirement", https://opendevlelopment.verizonwireless.com/open-access/article/OA-LTE-Req-Band13, Jul. 6, 2018, 250 pages.
The 3G4G Blog, "UICC and ISIM (IMS SIM)", Mar. 22, 2012, https://blog.3g4g.co.uk/2012/03/uicc-and-isim-ims-sim.html, 9 pages.

* cited by examiner

SYSTEMS AND METHODS FOR QUEUEING SUBSCRIBER IDENTITY MODULE PROFILES ON AN EMBEDDED UNIVERSAL INTEGRATED CIRCUIT CARD

BACKGROUND

Remote subscriber identity module (SIM) provisioning may be used to remotely activate a SIM embedded in a device. Such an embedded SIM (eSIM) may be used to remotely manage one or more mobile network operator subscriptions for the device.

DETAILED DESCRIPTION OF PREFERRED EMBODIMENTS

Figure 1:
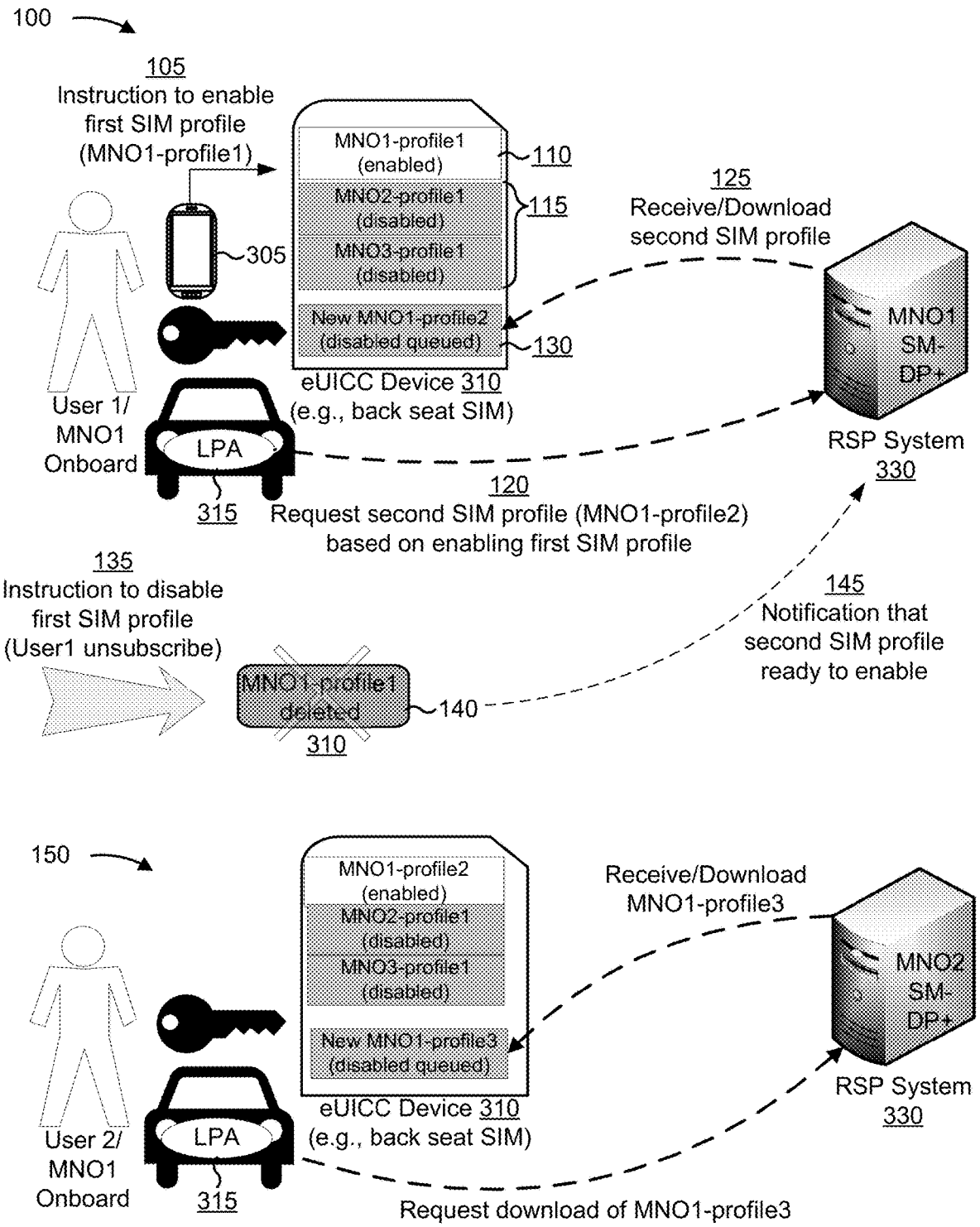
FIG. 1 is a diagram of an example implementation described herein.

The following detailed description of example implementations refers to the accompanying drawings. The same reference numbers in different drawings may identify the same or similar elements.

An embedded universal integrated circuit card (eUICC) may be embedded in a device, such as a vehicle (e.g., a car, a truck, a boat, and/or the like), an appliance, an electronic device (e.g., a security system, a thermostat, and/or the like), an Internet of Things (IoT) device, and/or the like, and may store one or more subscriber identity module (SIM) profiles that permit access to one or more corresponding mobile network operator (MNO) networks (e.g., cellular networks) at different times (e.g., where only one SIM profile can be enabled at a time). The SIM profiles may be remotely managed using remote SIM provisioning to install, enable, disable, and/or delete SIM profiles from the eUICC. For example, remote SIM provisioning may be used when a device with an eUICC changes ownership, when a subscription associated with the device changes, when a user switches to a different MNO, and/or the like. In these cases, a new SIM profile may need to be downloaded, installed, and enabled on the eUICC, which may be time consuming.

As an example, a user (e.g., an owner, a lessee, a renter, a driver, a passenger, and/or the like) of a vehicle may change, such as when the vehicle is bought, sold, leased to a different person, rented to a different person, and/or the like. In such cases, the new user may need to wait several minutes after subscribing with an MNO and starting the vehicle for a new SIM profile, associated with the new user, to be downloaded from a remote SIM provisioning system, installed on the eUICC, and enabled to permit the new user to use wireless network services, such as calling, messaging, setting up a wireless local area network (WLAN) hotspot, and/or the like. Furthermore, in locations with poor wireless network service, downloading the SIM profile may take even longer, or may not be possible. Some implementations described herein permit a SIM profile to be downloaded and installed (e.g., queued) far in advance of when the SIM profile is to be enabled, thereby reducing delays associated with setting up and enabling a new SIM profile on an eUICC. Furthermore, in some cases, errors may be encountered when downloading and/or installing a SIM profile. By permitting the SIM profile to be downloaded and installed far in advance of when the SIM profile is to be enabled, such errors may be resolved well in advance of when the SIM profile needs to be enabled.

In some cases, delays associated with downloading and installing a SIM profile may be avoided be reusing the same SIM profile across multiple users (e.g., with different subscriptions). For example, an old subscription may be disassociated with the SIM profile on an eUICC, and a new subscription may be associated with the SIM profile when a new user subscribes to a service for a device with the eUICC. However, this may expose customer proprietary network information (CPNI) and/or private information of a prior user to a later user, such as a phone number, location information, an international mobile subscriber identity (IMSI), an integrated circuit card identifier (ICCID), and/or the like, which may be stored in the SIM profile. Some implementations described herein prevent exposure of such CPNI and/or private information of a prior user to a later user by deleting a previously-used SIM profile and replacing the previously-used SIM profile with a new SIM profile. Additional details are described below.

FIG. 1 is a diagram of an example implementation 100 described herein. As shown by reference number 105, a first user (shown as User 1) may interact with a user device 305 to cause an instruction to be provided to an eUICC device 310 to enable a first SIM profile on the eUICC device 310. As shown, in some implementations, the eUICC device 310 may be included in and/or embedded in a vehicle 315 that includes a local profile assistant (LPA) to assist with managing the eUICC device 310. In some implementations, the eUICC device 310 may be referred to as a back seat SIM, and may store information for managing subscriptions associated with a user of the vehicle for wireless services such as calling, messaging, WLAN tethering, and/or the like. In some implementations, the vehicle 315 may include another eUICC device referred to as a front seat SIM, which may store information for managing subscriptions associated with a manufacturer of the vehicle for wireless services such as providing telematics data, maintenance data, navigation services, and/or the like.

In some implementations, a first user may interact with the user device 305 to subscribe to services provided by a first MNO (shown as MNO1), such as by logging in to a website and/or application of the first MNO and adding the vehicle 315 to an account of the first user. This may trigger an eUICC identifier (eID), unique to the eUICC device 310, to be provided to a subscription management device 325 associated with the first MNO (not shown in FIG. 1). The subscription management device 325 may identify, using a data structure stored in memory of the subscription management device 325, a SIM profile associated with the eID and the first MNO, and may activate the SIM profile to permit the eUICC device 310 to be used to access and communicate via a wireless network of the first MNO. In some implementations, the SIM profile may be uniquely identified using an integrated circuit card identifier (ICCID), which may be stored by the subscription management device 325 and associated with an account of the first user upon activation of the SIM profile.

In some implementations, the subscription management device 325 and/or the user device 305 may notify a remote SIM provisioning (RSP) system 330 that the eUICC device 310 has been associated with a subscription of the first MNO, and the RSP system 330 may transmit an instruction to enable a first SIM profile, associated with the first MNO, on the eUICC device 310. In some cases, a set of SIM profiles may be pre-installed on and stored in memory of the eUICC device 310 (e.g., at a time of manufacture), and may include SIM profiles for multiple different MNOs (e.g., one SIM profile per MNO). In some implementations, multiple SIM profiles may be installed on the eUICC device 310, but only a single SIM profile may be enabled on the eUICC device 310 at a time.

As shown by reference number 110, based on receiving the instruction to enable the first SIM profile (e.g., from the RSP system 330, the subscription management device 325, user interaction with a device integrated into the vehicle 315, and/or the like), the eUICC device 310 may enable the first SIM profile, shown as MNO1-profile1. As shown by reference number 115, the eUICC device 310 may store one or more other SIM profiles associated with other MNOs (e.g., shown as MNO2-profile1 and MNO3-profile1). As shown, these other SIM profiles may be installed on the eUICC device 310 in a disabled state when only one SIM profile is permitted to be enabled at a time. Each of the SIM profiles may be associated with a different ICCID that uniquely identifies a respective SIM profile. In some implementations, the eUICC device 310 may store no more than one disabled SIM profile for each MNO for which a SIM profile is stored on the eUICC device 310. Additionally, or alternatively, the eUICC device 310 may store no more than two SIM profiles (e.g., one enabled and one disabled) for the MNO with an enabled subscription (e.g., the first MNO), and no more than one SIM profile for each other MNO.

As shown by reference number 120, based on enabling the first SIM profile of the first MNO, the eUICC device 310 may request (e.g., via the LPA) a second SIM profile associated with the first MNO (shown as MNO1-profile2). For example, the request may be transmitted to an RSP system 330 associated with the first MNO (e.g., an enhanced subscription manager data preparation device, shown as SM-DP+). In some implementations, the eUICC device 310 may identify the first MNO associated with the first SIM profile, and may identify a network address (e.g., a fully qualified domain name (FQDN), a uniform resource identifier (URI), a uniform resource locator (URL), a uniform resource name (URN), and/or the like) associated with the first MNO. The network address may identify a location from which SIM profiles for the first MNO are to be obtained, and may be stored in memory of the LPA and/or the eUICC device 310 in association with an MNO identifier of the first MNO. When requesting the second SIM profile for the first MNO, the eUICC device 310 may transmit the request to the network address associated with the first MNO, which may point to the RSP system 330 that provisions SIM profiles for the first MNO. In some implementations, the eUICC device 310 may identify the first MNO associated with the first SIM profile by identifying the mobile country code (MCC) and mobile network code (MNC) associated with the first SIM profile using an IMSI prefix and/or an ICCID prefix associated with the first SIM profile. In some implementations, the eUICC device 310 (e.g., the LPA) may determine the MNO associated with the first SIM profile (e.g., based on the IMSI prefix and/or the ICCID prefix associated with the first SIM profile), and may look up the network address (e.g., an FQDN) based on the MNO.

In some implementations, the eUICC device 310 may request the second SIM profile within a threshold amount of time of enabling the first SIM profile (e.g., within 1 minute, 5 minutes, 10 minutes, 30 minutes, 1 hour, 1 day, and/or the like). In some implementations, the request may be the first communication transmitted by the eUICC device 310 after establishing a network connection with a network of the first MNO. In this way, delays associate with obtaining the second SIM profile may be reduced.

Upon receiving the request for the second SIM profile, the RSP system 330 may select a SIM profile from a group of SIM profiles stored in memory of the RSP system 330 and approved for use with the first MNO. The second SIM profile may be associated with a second ICCID that identifies the second SIM profile and that is different from a first ICCID that identifies the first SIM profile. As shown by reference number 125, the RSP system 330 may transmit the second SIM profile to the eUICC device 310 (e.g., via the LPA). In some implementations, the second SIM profile may be transmitted via a network connection associated with the first SIM profile, but may not be charged to an account of the first user. Additionally, or alternatively, the second SIM profile may be transmitted via a network connection associated with a different eUICC device (e.g., a front seat SIM) included in the vehicle 315.

As shown by reference number 130, the eUICC device 310 may receive the second SIM profile from the RSP system 330, and may install the second SIM profile in memory of the eUICC device 310 in a disabled state. Additionally, or alternatively, second SIM profile may be stored in a queued state, meaning that the second SIM profile is not permitted to be enabled until the first SIM profile is disabled and deleted from memory of the eUICC device 310. The second SIM profile may be a generic profile associated with the first MNO, and may not store an CPNI and/or private information of a user. In this way, the second SIM profile may be downloaded, installed, and ready to be enabled in advance of a time at which a second user subscribes to a service of the first MNO for the vehicle 315 (e.g., using the same eUICC device 310), thereby reducing delays associated with setting up wireless services for the second user. Furthermore, if an error occurs in association with downloading and/or installing the second SIM profile, there will be sufficient time for the eUICC device 310 to notify the RSP system 330 of the error and/or to resolve the error (e.g., retry the downlink, retry the installation, and/or the like).

As shown by reference number 135, at a later time, the first user may cancel the subscription associated with the first MNO. In some cases, the first user may sell the vehicle 315, return the vehicle 315 to a rental company or a lessor, and/or the like. In some implementations, the first user may cancel the subscription by interacting with the user device 305, contacting a representative of the first MNO, returning the vehicle 315 to a rental company or lessor (e.g., by interacting with a kiosk, detection of the end of a rental period, input indicating that the vehicle 315 has been returned, and/or the like), and/or the like. In either case, the eUICC device 310 may receive an indication (e.g., from the RSP system 330, the subscription management device 325, the user device 305, user interaction with a device integrated into the vehicle 315, and/or the like) that the subscription associated with the first SIM profile has been canceled. As shown by reference number 140, based on receiving this indication, the eUICC device 310 may disable the first SIM profile, and may delete the first SIM profile from memory of the eUICC device 310. In this way, CPNI and/or private information of the first user may not be exposed to a later user.

Additionally, or alternatively, as shown by reference number 145, the eUICC device 310 may transmit (e.g., via the LPA) a notification that the second SIM profile is ready to be enabled (e.g., is ready to exit the queued state such that the second SIM profile can be enabled upon the eUICC device 310 receiving an instruction to enable the second SIM profile). As shown, this notification may be transmitted to the RSP system 330. In some implementations, if this notification is transmitted after the first SIM profile is disabled and/or deleted, then the notification cannot be transmitted using a network connection associated with the first SIM profile since the first SIM profile can no longer be used for network access. In this case, the notification may be transmitted using a different eUICC device included in the vehicle 315 (e.g., a front seat SIM). Alternatively, the notification may be transmitted using a network connection associated with the first SIM profile prior to disabling and deleting the first SIM profile. In this case, once the notification has been transmitted by the eUICC device 310 and/or a confirmation of receipt (e.g., an acknowledgement (ACK)) of the notification has been received by the eUICC device 310, the eUICC device 310 may disable and delete the first SIM profile.

As shown by reference number 150, when a second user (shown as User 2) subscribes to a service provided by a first MNO for the same eUICC device 310 (e.g., on the same vehicle 315), the eUICC device 310 may enable the second SIM profile (e.g., by obtaining and storing CPNI and/or private information of the second user), in a similar manner as described above. Because the eUICC device 310 does not need to download and install the second SIM profile upon receiving a notification of the subscription (e.g., because the second SIM profile has already been downloaded and installed, as described above), the amount of time needed to enable the second SIM may be reduced, thereby leading to a better user experience. As further shown, when the second SIM profile of the first MNO is enabled on the eUICC device 310, the eUICC device 310 may obtain a third SIM profile of the first MNO from the RSP system 330, and may install the third SIM profile in a disabled state, in a similar manner as described above.

Although the second user is described as subscribing with the same MNO as the first user, in some cases, the second user may subscribe with a different MNO than the first user, such as a second MNO (e.g., MNO2). In this case, the eUICC device 310 may enable a SIM profile associated with the second MNO (e.g., MNO2-profile1), and may request another SIM profile associated with the second MNO, in a similar manner as described above. In this way, a second SIM profile may always be queued for the MNO for which a first SIM profile is enabled, thereby reducing the amount of time needed to enable the second SIM profile in the future.

As indicated above, FIG. 1 is provided merely as an example. Other examples are possible and can differ from what was described with regard to FIG. 1. For example, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
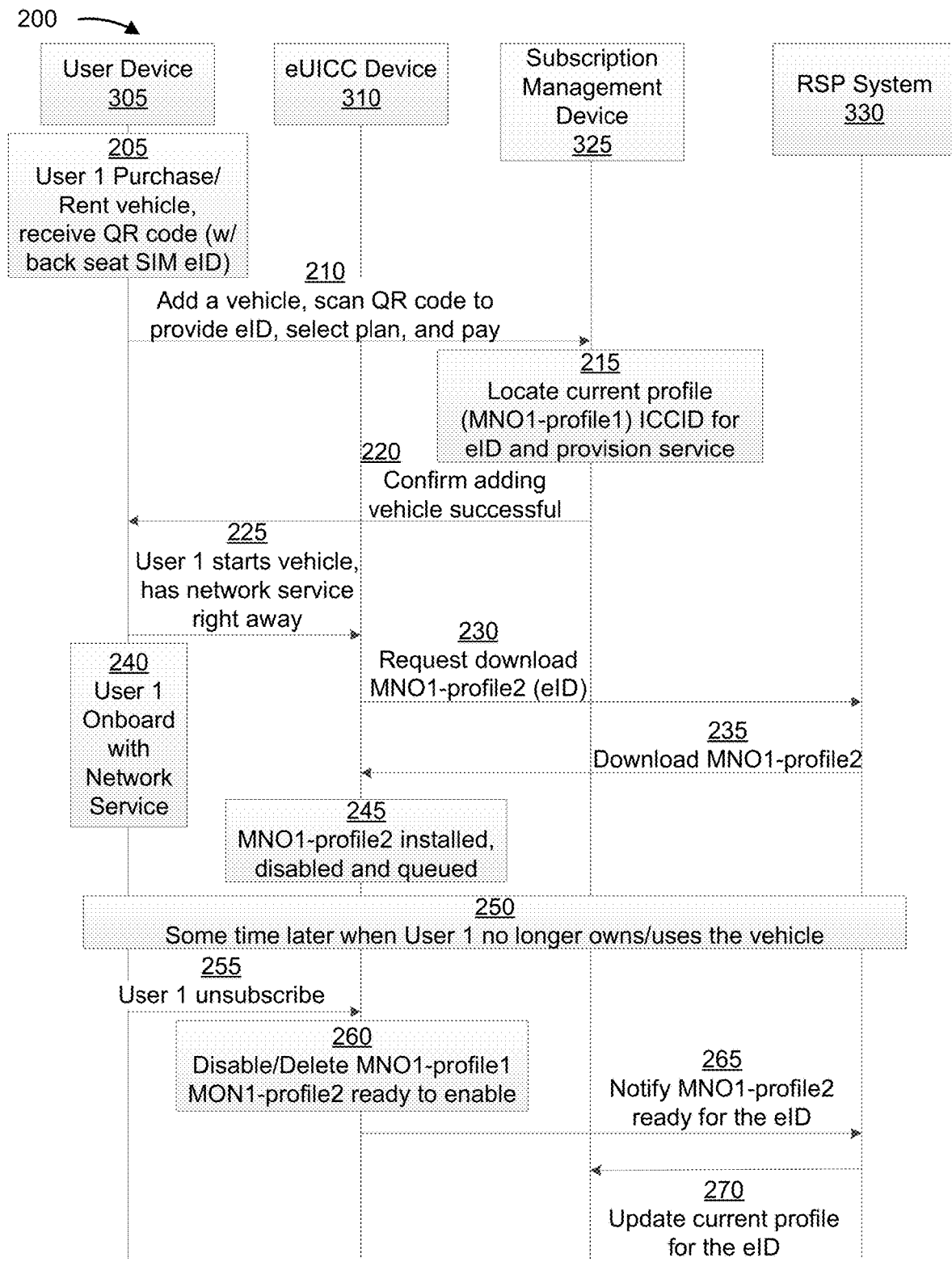
FIG. 2 is a diagram of an example call flow described herein.

FIG. 2 is a diagram of an example call flow 200 described herein. Call flow 200 shows example communications between a user device 305, an eUICC device 310, a subscription management device 325, and an RSP system 330. These devices are described in more detail below in connection with FIG. 3. The subscription management device 325 may be associated with a specific MNO (e.g., MNO1), and the RSP system 330 may be associated with the specific MNO (e.g., an RSP vendor that contracts with the specific MNO).

As shown by reference number 205, a first user (User 1) may purchase, rent, lease, or use a vehicle 315 (e.g., a car), and may be provided with a Quick Response (QR) code with embedded information, which may include a eUICC identifier (eID) for the eUICC device 310 (e.g., a back seat SIM). As shown by reference number 210, the first user may interact with the user device 305 to scan the QR code and establish a subscription plan of the specific MNO for the vehicle 315 (and the eUICC device 310) and/or to add the subscription plan to an account of the first user. As shown, the eID and subscription information (e.g., a data limit, a message limit, a call minute limit, and/or the like) may be provided from the user device 305 to the subscription management device 325. A QR code is described as an example, and other ways of providing the eID are possible. For example, in some implementations, the subscription management device 325 may receive the eID and/or the subscription information in a different manner, such as based on input by a customer service representative of the specific MNO that assists the first user with the subscription, input of the user's phone number by a rental company representative in association with the vehicle 315, other types of barcodes, input of a vehicle identification number (VIN), and/or the like.

As shown by reference number 215, the subscription management device 325 may locate a current SIM profile (shown as MNO1-profile1, and described above in connection with FIG. 1) that is installed on the eUICC device 310 and associated with the specific MNO. For example, the eUICC device 310 may be pre-provisioned with a SIM profile for the specific MNO. At the time of manufacture (or shortly thereafter), a set of SIM profiles may be installed on the eUICC device 310, and one of those SIM profiles may be associated with the specific MNO. The subscription management device 325 may receive (e.g., from the RSP system 330) information that identifies the eID of the eUICC device 310 and the SIM profile, associated with the specific MNO, that is installed on the eUICC device 310. This information may be stored in a data structure, and the subscription management device 325 may use this data structure and the received eID of the eUICC device 310 to look up the ICCID of the SIM profile installed on the eUICC device 310. The subscription management device 325 may activate and/or provision service for the eUICC device 310, such as by storing an association between the ICCID, a phone number (e.g., a mobile directory number (MDN), a mobile station international subscriber directory number (MSISDN), and/or the like) or other identifying information associated with the first user, and/or information associated with the subscription plan. In some implementations, such information may be stored in a home subscriber server (HSS), an authentication, authorization, and accounting (AAA) server, a policy charging rules function (PCRF) server, and/or a similar type of device.

As shown by reference number 220, the subscription management device 325 may provide a notification to the user device 305 to confirm that the vehicle 315 was successfully added to an account of the first user. As shown by reference number 225, the first user may be able to use network services upon starting the vehicle 315. For example, the subscription management device 325 may instruct the eUICC device 310 to enable the first SIM profile (MNO1-profile1). Additionally, or alternatively, the RSP system 330 may instruct the eUICC device 310 to enable the first SIM profile (e.g., based on a message from the subscription management device 325).

As shown by reference number 230, based on enabling the first SIM profile, the eUICC device 310 may request to download a second SIM profile for the specific MNO (e.g., MNO1-profile2). As shown, the request may include an eID of the eUICC device 310. As shown by reference number 235, the RSP system 330 may select a SIM profile (e.g., the second SIM profile, shown as MNO1-profile2), and may transmit the SIM profile to the eUICC device 310. Additionally, or alternatively, the RSP system 330 may send a message to the subscription management device 325 to permit the subscription management device 325 to link the second SIM profile with the eID for future use (e.g., when the first SIM profile is disabled and/or when a request is received from a second user to activate the second SIM profile).

As shown by reference number 240, the second SIM profile may be obtained by the eUICC device 310 while the first user is connected with network service for the specific MNO. In some implementations, a network connection associated with the first SIM profile may be used to obtain the second SIM profile. Additionally, or alternatively, a network connection associated with another eUICC device of the vehicle 315 (e.g., a front seat SIM and/or the like) may be used to obtain the second SIM profile. As shown by reference number 245, the eUICC device 310 may install the second SIM profile in memory of the eUICC device 310 in a disabled state, thus queueing the second SIM profile for later use after the first SIM profile is disabled and/or deleted.

As shown by reference number 250, at a later time, the first user may no longer need or use the vehicle 315, and may sell the vehicle 315, return the vehicle 315 to a rental company, return the vehicle 315 to a leasing company, end a subscription for the vehicle 315, stop using the vehicle 315 for ride-sharing, and/or the like. As shown by reference number 255, the first user may cancel a subscription (e.g., by using the user device 305, by interacting with a customer service representative of the first MNO, by failing to pay a bill, and/or the like), and the eUICC device 310 may receive a notification of such cancellation (e.g., from the user device 305, from the subscription management device 325, from the RSP system 330, and/or the like).

As shown by reference number 260, the eUICC device 310 may disable and delete the first SIM profile based on receiving the notification of the cancellation. Additionally, or alternatively, the eUICC device 310 may disable and delete the first SIM profile based on an indication that the user is no longer associated with the vehicle 315 (e.g., when the user returns the vehicle 315, sells the vehicle 315, and/or the like). As such, the second SIM profile may be ready to be enabled (e.g., by a later user). As shown by reference number 265, the eUICC device 310 may notify the RSP system 330 that the second SIM profile is ready to be enabled in association with the eID of the eUICC device 310. For example, the eUICC device 310 may transmit the eID and the ICCID of the second SIM profile to the RSP system 330. As shown by reference number 270, the RSP system 330 may send a message to the subscription management device 325, that includes the eID and the ICCID of the second SIM profile, to permit the subscription management device 325 to link the second SIM profile with the eID for future use (e.g., when the first SIM profile is disabled and/or when a request is received from a second user to activate the second SIM profile).

In some implementations, the message from the RSP system 330 to the subscription management device 325, which includes the eID and the ICCID of the second SIM profile, may be transmitted after the RSP system 330 receives the indication that the second SIM profile is ready to be enabled on the eUICC device 310, as shown by reference number 270. In some implementations, this message may be transmitted from the RSP system 330 to the subscription management device 325 before receiving the indication that the second SIM profile is ready to be enabled on the eUICC device 310. For example, the message may be transmitted based on receiving a request from the eUICC device 310 for the second SIM profile and/or based on transmitting the second SIM profile to the eUICC device 310, as described above in connection with reference numbers 230 and 235.

In this way, when a second user purchases, rents, leases, or uses the vehicle 315 and establishes and/or adds a subscription plan of the specific MNO for the vehicle 315 (and the eUICC device 310), the second SIM profile may be immediately enabled since the second SIM profile has been previously downloaded by the eUICC device 310, installed by the eUICC device 310, and linked with the eID of the eUICC device 310 in a data structure of the subscription management device 325.

As indicated above, FIG. 2 is provided merely as an example. Other examples are possible and can differ from what was described with regard to FIG. 2. For example, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
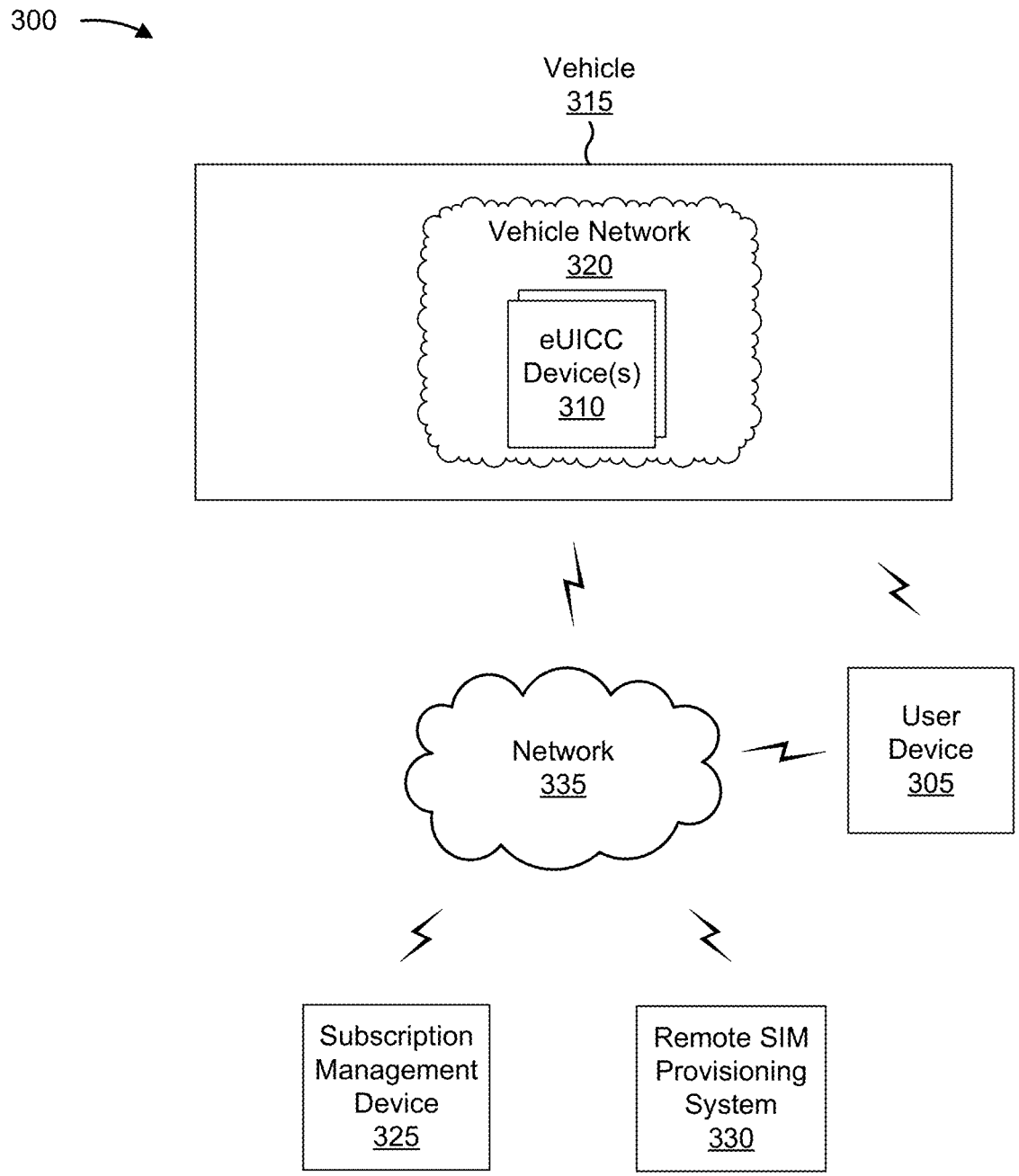
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a user device 305, one or more eUICC devices 310, a vehicle 315, a vehicle network 320, a subscription management device 325, a remote SIM provisioning (RSP) system 330, a network 335, and/or the like. Devices of environment 300 may interconnect via wired connections, wireless connections, or a combination of wired and wireless connections.

The user device 305 includes one or more devices capable of receiving, generating, storing, processing, and/or providing information associated with subscribing to network services. For example, the user device 305 may include a device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), and/or a similar type of device.

The eUICC device 310 may include an eUICC and/or a device that includes an eUICC. For example, the eUICC device 310 may include a SIM (e.g., a front seat SIM, a back seat SIM, and/or the like), a SIM card, a smart card, a device with an eUICC soldered to a circuit board, a device with a plugged-in eUICC, and/or the like. As used herein, eUICC device 310 may refer to just the eUICC or may refer to an eUICC and connected components, such as communication components (e.g., a modem for wireless communications, a baseband processor, one or more RF components, one or more antennas, and/or the like). The communication components may be used to communicate with one or more other devices of FIG. 3, such as the RSP system 330. In some implementations, the eUICC device 310 may include a local profile assistant (LPA) to assist with managing SIM profiles of the eUICC device 310.

A SIM profile may store information, files, and/or applications that permit access to a wireless network (e.g., a cellular network and/or the like). For example, a SIM profile may include a UMTS SIM (USIM), an Internet Protocol multimedia services identity module (ISIM), a CDMA SIM (CSIM), and/or the like, and may store a phone number, an international mobile subscriber identity (IMSI), an eID, IMS registration information, parameters for CDMA service, a network identifier, a preferred local network identifier (e.g., to identify a home network, one or more roaming networks, one or more allowed networks, one or more barred networks, and/or the like), location information (e.g., a cell identifier), a public land mobile network (PLMN) identifier, an MNO identifier, a mobile country code (MCC), a new exchange key, one or more other security keys, and/or the like.

The vehicle 315 may include any type of vehicle. In some implementations, the vehicle 315 includes a car, a truck, a bus, a motorcycle, a boat, construction equipment, and/or the like. In some implementations, the vehicle 315 may include multiple eUICC devices 310, such as a front seat eUICC device 310 (e.g., that includes a front seat SIM) and a back seat eUICC device 310 (e.g., that includes a back seat SIM). Each eUICC device may have a different eID. Although implementations are described herein in connection with a vehicle 315, such implementations may apply in connection with another type of machine for which ownership could change hands, subscriptions could change, and/or the like, such as an appliance (e.g., a household appliance with an embedded eUICC), an electronic device, an IoT device, and/or the like.

The vehicle network 320 includes a network that permits components of the vehicle 315 to communicate with one another. Additionally, or alternatively, the vehicle network 320 may permit such components to communicate with devices external from the vehicle 315, such as the user device 305, the subscription management device 325, the RSP system 330, and/or the like. For example, the vehicle network 320 may include a controller area network (CAN), a car area network, a vehicle area network, and/or the like.

The subscription management device 325 includes one or more devices that assist with managing subscriptions for an MNO. For example, the subscription management device 325 may include a server, an HSS, an AAA server, a PCRF server, and/or the like. In some implementations, the subscription management device 325 may store information that links a user account, an eID, an ICCID, a subscription plan, and/or the like. In some implementations, the subscription management device 325 is located in a core network of an MNO. Additionally, or alternatively, the subscription management device 325 may be a component of a cloud computing environment.

The RSP system 330 includes one or more devices capable of remote SIM provisioning. For example, the RSP system 330 may include a server, a collection of servers, one or more components of a cloud computing environment, and/or the like. The RSP system 330 may store a group of SIM profiles for an MNO (or for multiple MNOs), and may provision eUICC devices 310 with those SIM profiles, as described elsewhere herein.

The network 335 includes one or more wired and/or wireless networks. For example, the network 335 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
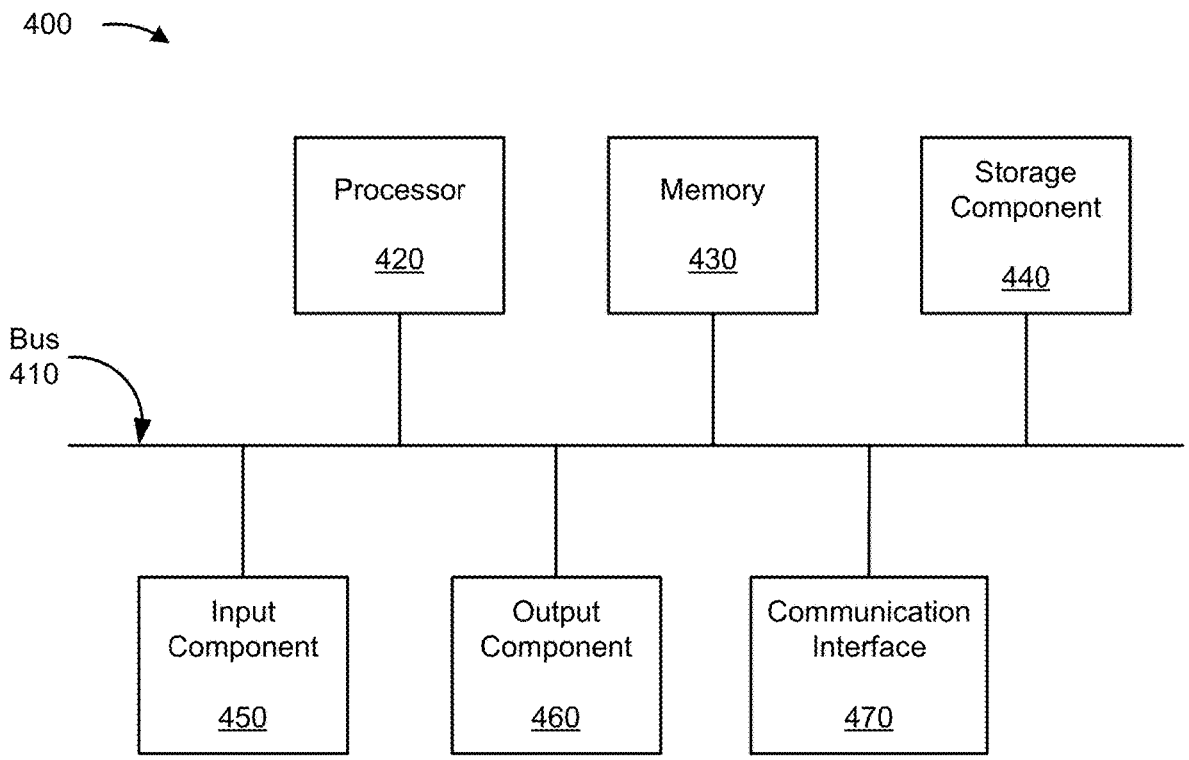
FIG. 4 is a diagram of example components of one or more devices of FIG. 3.

FIG. 4 is a diagram of example components of a device 400. Device 400 may correspond to user device 305, eUICC device 310, subscription management device 325, RSP system 330, and/or the like. In some implementations user device 305, eUICC device 310, subscription management device 325, RSP system 330, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
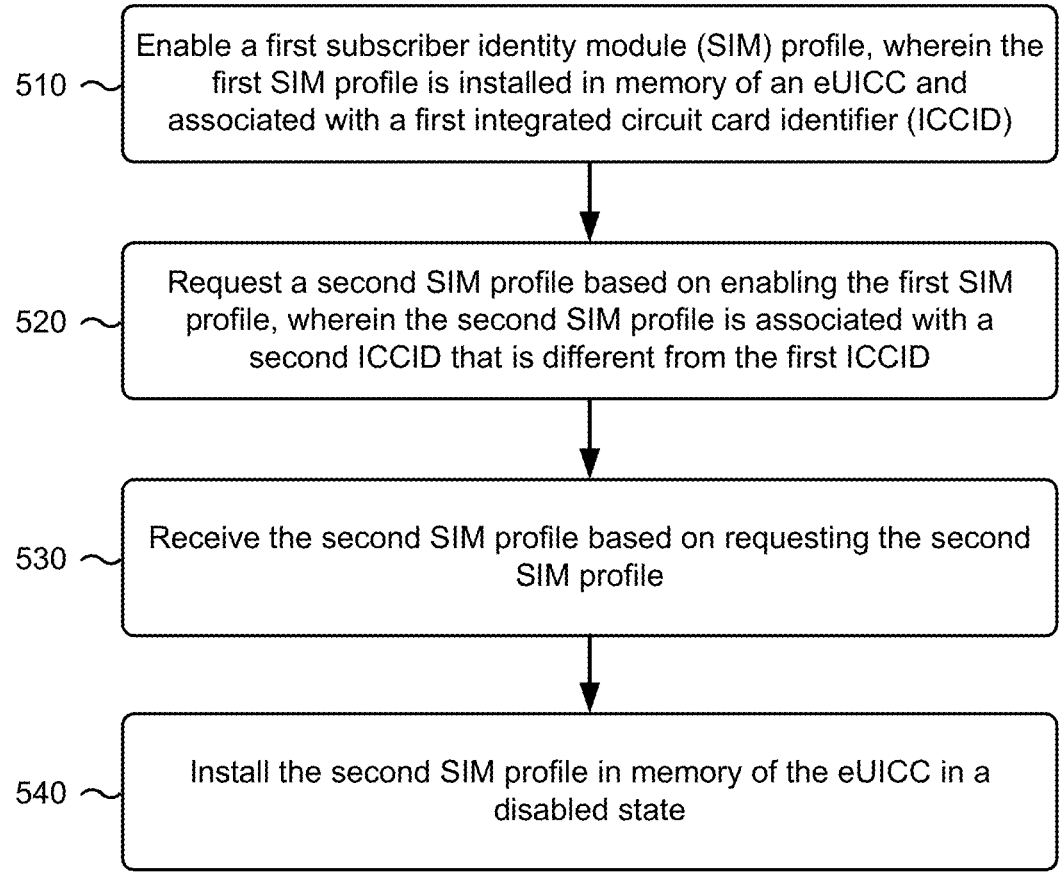
FIG. 5 is a flow chart of an example process associated with queuing SIM profiles on an embedded universal integrated circuit card (eUICC)

FIG. 5 is a flow chart of an example process 500 associated with queuing SIM profiles on an eUICC. In some implementations, one or more process blocks of FIG. 5 may be performed by eUICC device 310. In some implementations, the eUICC device 310 is embedded in a vehicle 315. In some implementations, one or more process blocks of FIG. 5 may be performed by another device or a group of devices separate from or including eUICC device 310, such as user device 305, subscription management device 325, RSP system 330, one or more components of vehicle 315, and/or the like.

As shown in FIG. 5, process 500 may include enabling a first subscriber identity module (SIM) profile, wherein the first SIM profile is installed in memory of the eUICC and associated with a first integrated circuit card identifier (IC-CID) (block 510). For example, the eUICC device (e.g., using processor 420, memory 430, and/or the like) may enable a first SIM profile, as described above in connection with FIGS. 1-2. In some implementations, the first SIM profile is installed in memory of the eUICC and associated with a first ICCID. In some implementations, the eUICC device may enable the first SIM profile based on receiving an instruction to enable the first SIM profile.

As further shown in FIG. 5, process 500 may include requesting a second SIM profile based on enabling the first SIM profile, wherein the second SIM profile is associated with a second ICCID that is different from the first ICCID (block 520). For example, the eUICC device (e.g., using processor 420, memory 430, communication interface 470, and/or the like) may request a second SIM profile based on enabling the first SIM profile, as described above in connection with FIGS. 1-2. In some implementations, the second SIM profile is associated with a second ICCID that is different from the first ICCID.

In some implementations, when requesting the second SIM profile, the eUICC device may determine a mobile network operator (MNO) associated with the first SIM profile, and may determine a network address (e.g., a URI, a URL, a URN, and/or the like) associated with the MNO. The eUICC device may request the second SIM profile using the network address associated with the MNO. In this case, the first SIM profile and the second SIM profile are associated with a specific mobile network operator (e.g., the same mobile network operator). Additionally, or alternatively, the eUICC may store no more than two SIM profiles for the specific mobile network operator, and may store no more than one SIM profile for each mobile network operator, other than the specific mobile network operator, for which a SIM profile is stored on the eUICC.

As further shown in FIG. 5, process 500 may include receiving the second SIM profile based on requesting the second SIM profile (block 530). For example, the eUICC device (e.g., using processor 420, memory 430, communication interface 470, and/or the like) may receive the second SIM profile based on requesting the second SIM profile, as described above in connection with FIGS. 1-2. In some implementations, the eUICC device may receive the second SIM profile from a remote SIM provisioning system. For example, the eUICC device may receive the second SIM profile via a first network connection associated with the first SIM profile. Additionally, or alternatively, the eUICC device may receive the second SIM profile via a second network connection associated with a different eUICC device included in a same machine (e.g., vehicle) as the eUICC device.

As further shown in FIG. 5, process 500 may include installing the second SIM profile in memory of the eUICC in a disabled state (block 540). For example, the eUICC device (e.g., using processor 420, memory 430, and/or the like) may install the second SIM profile in memory of the eUICC in a disabled state, as described above in connection with FIGS. 1-2.

In some implementations, the eUICC device may receive an instruction to disable the first SIM profile, and may disable the first SIM profile based on receiving the instruction to disable the first SIM profile. In some implementations, the eUICC device may delete the first SIM profile from memory of the eUICC after disabling the first SIM profile. Additionally, or alternatively, the eUICC device may transmit information indicating that the second SIM profile is ready to be enabled and/or provisioned based on receiving the instruction to disable the first SIM profile. For example, such information may be transmitted to a remote SIM provisioning system. In some implementations, the information indicating that the second SIM profile is ready to be enabled is transmitted to the remote SIM provisioning system by a different eUICC device included in a same machine (e.g., vehicle) as the eUICC device.

In some implementations, the eUICC device may receive an instruction to enable the second SIM profile, may enable the second SIM profile based on receiving the instruction to enable the second SIM profile, and may obtain a third SIM profile based on enabling the second SIM profile. The third SIM profile may be associated with a third ICCID that is different from the first ICCID of the first SIM profile and the second ICCID of the second SIM profile. The eUICC device may install the third SIM profile in memory of the eUICC in a disabled state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
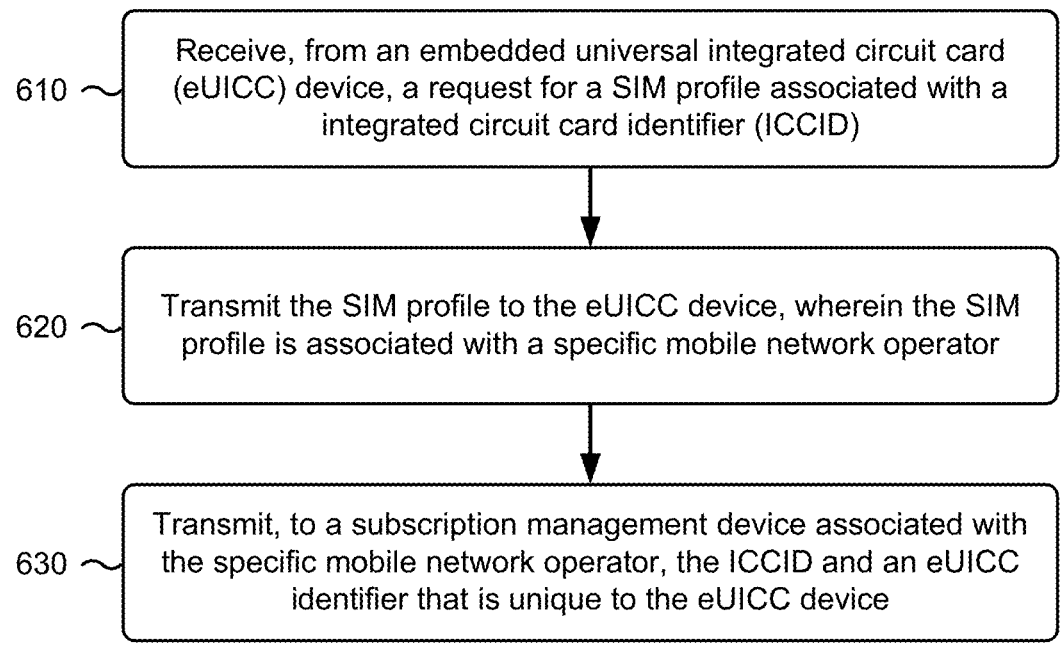
FIG. 6 is a flow chart of another example process associated with queuing SIM profiles on an eUICC.

FIG. 6 is a flow chart of an example process 600 associated with queuing SIM profiles on an eUICC. In some implementations, one or more process blocks of FIG. 6 may be performed by RSP system 330. In some implementations, one or more process blocks of FIG. 6 may be performed by another device or a group of devices separate from or including RSP system 330, such as user device 305, eUICC device 310, subscription management device 325, one or more components of vehicle 315, and/or the like.

As shown in FIG. 6, process 600 may include receiving, from an embedded universal integrated circuit card (eUICC) device, a request for a SIM profile associated with an integrated circuit card identifier (ICCID) (block 610). For example, the RSP system (e.g., using processor 420, memory 430, communication interface 470, and/or the like) may receive a request for a SIM profile associated with an ICCID, as described above in connection with FIGS. 1-2. In some implementations, the request may be received from an eUICC device. In some implementations, the request for the SIM profile is received after another SIM profile, associated with the specific mobile network operator, is enabled on the eUICC device.

As further shown in FIG. 6, process 600 may include transmitting the SIM profile to the eUICC device, wherein the SIM profile is associated with a specific mobile network operator (block 620). For example, the RSP system (e.g., using processor 420, memory 430, communication interface 470, and/or the like) may transmit the SIM profile to the eUICC device, as described above in connection with FIGS. 1-2. The SIM profile may be associated with a specific mobile network operator.

As further shown in FIG. 6, process 600 may transmit, to a subscription management device associated with the specific mobile network operator, the ICCID and an eUICC identifier that is unique to the eUICC device (block 630). For example, the RSP system (e.g., using processor 420, memory 430, communication interface 470, and/or the like) may transmit the ICCID and an eUICC identifier that is unique to the eUICC device, as described above in connection with FIGS. 1-2. In some implementations, the RSP system may transmit such information to a subscription management device associated with the specific mobile network operator.

In some implementations, the RSP system may transmit the ICCID and the eUICC identifier based on receiving the request for the SIM profile and before receiving an indication that the SIM profile is ready to be enabled on the eUICC device. Alternatively, the RSP system may transmit the ICCID and the eUICC identifier after receiving an indication that the SIM profile is ready to be enabled on the eUICC device. Transmission of the ICCID and the eUICC identifier may cause the subscription management device to store an association between the ICCID and the eUICC identifier. In this way, the SIM profile can be prepared in advance of when the SIM profile is needed by storing such association in memory of the subscription management device, thereby permitting the SIM profile to be enabled without delays associated with obtaining and/or storing the association when the SIM profile is requested to be enabled.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by an embedded universal integrated circuit card (eUICC) device, an instruction to enable a first subscriber identity module (SIM) profile,
      wherein the first SIM profile is installed in memory of the eUICC device and associated with a first integrated circuit card identifier (ICCID);
   enabling, by the eUICC device, the first SIM profile based on receiving the instruction to enable the first SIM profile;
   obtaining, by the eUICC device and based on requesting a second SIM profile, the second SIM profile being installed in a disabled state and stored in a queued state, within a threshold amount of time of enabling the first SIM profile, the second SIM profile to store in a queued state based on enabling the first SIM profile,
      wherein the second SIM profile is associated with a second ICCID that is different from the first ICCID; and
   installing, by the eUICC device, the second SIM profile in memory of the eUICC device in a disabled state.

2. The method of claim 1, wherein the first SIM profile and the second SIM profile are associated with a same mobile network operator.

3. The method of claim 1, further comprising:
   identifying a mobile network operator (MNO) associated with the first SIM profile;
   identifying a uniform resource identifier (URI) associated with the MNO; and
   wherein obtaining the second SIM profile comprises requesting the second SIM profile using the URI associated with the MNO.

4. The method of claim 1, wherein obtaining the second SIM profile comprises receiving the second SIM profile from a remote SIM provisioning system prior to expiration of the first SIM profile.

5. The method of claim 1, further comprising:
   receiving an instruction to disable the first SIM profile;
   disabling the first SIM profile based on receiving the instruction to disable the first SIM profile; and
   transmitting, to a remote SIM provisioning system, information indicating that the second SIM profile is ready to be enabled based on receiving the instruction to disable the first SIM profile.

6. The method of claim 5, wherein the information indicating that the second SIM profile is ready to be enabled is transmitted to the remote SIM provisioning system by a different eUICC device included in a same machine as the eUICC device.

7. The method of claim 1, wherein the second SIM profile is obtained via at least one of:
   a first network connection associated with the first SIM profile, or
   a second network connection associated with a different eUICC device included in a same machine as the eUICC device.

8. A device that includes an embedded universal integrated circuit card (eUICC), comprising:
   one or more memories; and
   one or more processors, communicatively coupled to the one or more memories, to:
      enable a first subscriber identity module (SIM) profile,
         wherein the first SIM profile is installed in memory of the eUICC and associated with a first integrated circuit card identifier (ICCID);
      request, within a threshold amount of time, a second SIM profile, the second SIM profile being installed in a disabled state and stored in a queued state, based on enabling the first SIM profile,
         wherein the second SIM profile is associated with a second ICCID that is different from the first ICCID;
      receive the second SIM profile to store in a queued state based on requesting the second SIM profile; and
      install the second SIM profile in memory of the eUICC in a disabled state.

9. The device of claim 8, wherein the one or more processors, when requesting the second SIM profile, are further to:
   determine a mobile network operator (MNO) associated with the first SIM profile;
   determine a network address associated with the MNO; and
   request the second SIM profile using the network address associated with the MNO.

10. The device of claim 8, wherein the first SIM profile and the second SIM profile are associated with a specific mobile network operator.

11. The device of claim 10, wherein the eUICC stores two SIM profiles for the specific mobile network operator and stores one SIM profile for each mobile network operator, other than the specific mobile network operator, for which a SIM profile is stored on the eUICC.

12. The device of claim 8, wherein the one or more processors are further to:
   receive an instruction to disable the first SIM profile;
   disable the first SIM profile based on receiving the instruction to disable the first SIM profile; and
   delete the first SIM profile from memory of the eUICC after disabling the first SIM profile.

13. The device of claim 12, wherein the one or more processors are further to:
   transmit information indicating that the second SIM profile is ready to be provisioned based on receiving the instruction to disable the first SIM profile.

14. The device of claim 8, wherein the one or more processors are further to:
   receive an instruction to enable the second SIM profile;
   enable the second SIM profile based on receiving the instruction to enable the second SIM profile;

obtain a third SIM profile based on enabling the second SIM profile, wherein the third SIM profile is associated with a third ICCID that is different from the first ICCID and the second ICCID; and install the third SIM profile in memory of the eUICC in a disabled state.

15. The device of claim 8, wherein the device is embedded in a vehicle.

16. A remote subscriber identity module (SIM) provisioning system, comprising:

one or more memories; and one or more processors, communicatively coupled to the one or more memories, to:

receive, from an embedded universal integrated circuit card (eUICC) device, a request for a SIM profile, the SIM profile being installed in a disabled state and stored in a queued state, associated with an integrated circuit card identifier (ICCID), wherein the request for the SIM profile to store in a queued state is received within a threshold amount of time of another SIM profile being enabled on the eUICC device;

transmit the SIM profile to the eUICC device, wherein the SIM profile is associated with a specific mobile network operator; and transmit, to a subscription management device associated with the specific mobile network operator, the ICCID and an eUICC identifier that is unique to the eUICC device.

17. The remote SIM provisioning system of claim 16, wherein the other SIM profile is associated with the specific mobile network operator.

18. The remote SIM provisioning system of claim 16, wherein the ICCID and the eUICC identifier are transmitted to the subscription management device based on the request and before receiving an indication that the SIM profile is ready to be enabled on the eUICC device.

19. The remote SIM provisioning system of claim 16, wherein the ICCID and the eUICC identifier are transmitted to the subscription management device after receiving an indication that the SIM profile is ready to be enabled on the eUICC device.

20. The remote SIM provisioning system of claim 16, wherein transmission of the ICCID and the eUICC identifier causes the subscription management device to store an association between the ICCID and the eUICC identifier.

* * * * *